(12) United States Patent
Persson

(10) Patent No.: US 6,875,393 B2
(45) Date of Patent: Apr. 5, 2005

(54) METHOD AND ASSEMBLY FOR INJECTION MOULDING

(75) Inventor: Lars Persson, Kristianstad (SE)

(73) Assignee: Nolato AB, Torekov (SE)

( * ) Notice: Subject to any disclaimer, the term of this patent is extended or adjusted under 35 U.S.C. 154(b) by 376 days.

(21) Appl. No.: 10/038,665

(22) Filed: Jan. 8, 2002

(65) Prior Publication Data

US 2003/0067095 A1 Apr. 10, 2003

(30) Foreign Application Priority Data

Oct. 10, 2001 (SE) .............................................. 0103383

(51) Int. Cl.[7] .............................................. B29C 45/64
(52) U.S. Cl. .............................. 264/328.1; 425/451.7; 425/451.9; 425/587; 425/588
(58) Field of Search .................... 264/328.1; 425/451.7, 425/451.9, 587, 588

(56) References Cited

U.S. PATENT DOCUMENTS

| | | | |
|---|---|---|---|
| 3,346,924 A | * 10/1967 | Lombard | 425/419 |
| 3,977,661 A | * 8/1976 | Ruegg | 269/57 |
| 4,088,432 A | * 5/1978 | Farrell | 425/451.6 |
| 4,344,601 A | 8/1982 | Fink et al. | |
| 4,345,890 A | * 8/1982 | Hemmi et al. | 425/143 |
| 4,424,015 A | * 1/1984 | Black et al. | 425/138 |
| 5,052,910 A | * 10/1991 | Hehl | 425/150 |
| 5,114,335 A | * 5/1992 | Tinsley | 425/577 |
| 5,736,173 A | * 4/1998 | Wright et al. | 425/577 |
| 5,776,517 A | 7/1998 | Ciccone et al. | |
| 6,030,569 A | 2/2000 | Yu | |
| 6,220,848 B1 | * 4/2001 | Kaselow et al. | 425/443 |
| 6,521,165 B2 | * 2/2003 | Rick | 264/334 |
| 6,665,192 B2 | * 12/2003 | Wimberger Friedl et al. | 361/752 |

FOREIGN PATENT DOCUMENTS

| | | |
|---|---|---|
| EP | 0 365 464 | 4/1990 |
| EP | 0 864 410 | 9/1998 |

* cited by examiner

Primary Examiner—Allan R. Kuhns
(74) Attorney, Agent, or Firm—Burns, Doane, Swecker & Mathis, LLP

(57) ABSTRACT

A method for injection moulding, comprising introducing, under pressure, a melt into a cavity (14) defined by two mould halves (10, 11) of a mould (6). The method is characterized by the steps of joining the mould halves (10, 11), for definition of said cavity (14), by moving at least one of the mould halves (11) along a first axis, and, by moving along a second axis extending transversely of said first axis, arranging a locking means (7) on the mould (6). The locking means (7) has locking surfaces (19) which grasp the mould (6) and its joined mould halves (10, 11), at least one locking surface (19) wedgingly engaging a complementarily designed surface (17) of the mould (6) to cause conversion of the force by which the locking means (7) is arranged on the mould (6), into a locking force for holding together the mould halves (10, 11) in their joined state. The present invention also concerns an injection moulding assembly as well as a mould for injection moulding assemblies.

21 Claims, 6 Drawing Sheets

METHOD AND ASSEMBLY FOR INJECTION MOULDING

FIELD OF THE INVENTION

The present invention relates to a method and an assembly for injection moulding and, more specifically, such a method comprising introduction, under pressure, of a melt into a cavity defined by two mould halves of a mould, and a corresponding assembly.

BACKGROUND ART

Injection moulding is a common manufacturing process for producing components, such as plastic, silicone, metal or rubber components.

A conventional injection moulding assembly comprises two sections which each support a mould half. The sections are joinable by means of a unit intended for the purpose.

For injection moulding of a component, the sections, and thus also their mould halves, are brought together. The mould halves define in their joined state a cavity. A melt is introduced under pressure into the cavity and, after the necessary cooling, the sections can be divided and the completed component be ejected.

When introducing the melt into the cavity, a dividing force arises, which acts to divide the mould halves. This dividing force is the product of the pressure at which the melt is introduced into the cavity, and the surface area projected parallel to the parting plane of the mould halves. To prevent such separation of the mould halves, it is thus necessary for the mould halves to be held together by means of a locking force that is not less than said dividing force.

To achieve a high production capacity, it is common for the mould halves to define a plurality of cavities, thereby making it possible to produce a plurality of components during each injection moulding shot. Of course, the projected surface area will be larger. At an unchanged pressure, the dividing force will thus be higher.

The unit that acts to bring together the sections has a limited maximum locking force, by means of which it can hold together the sections, and therefore this unit is a limiting factor to the production capacity that can be achieved in the injection moulding assembly.

If a higher production capacity is desired, resulting in a dividing force which is higher than this maximum locking force of the unit, the components must be produced in a larger and, thus, also considerably more expensive injection moulding assembly.

CH653286 discloses a mould which to some extent solves this problem. The mould comprises a valve means which ensures that the melt during an injection moulding shot is in turn passed to separate groups of cavities. Owing to the fact that all cavities are not filled at the same time, the dividing force can be retained at an advantageously low level. However, the problem of this solution is that it necessitates a valve means, which can affect the flow configuration of the melt and, thus, also the final quality of the injection moulded components. It will also be appreciated that such sequential filling of the cavities results in the injection moulding cycle taking more time, which has a detrimental effect on the production capacity.

DE3937473 discloses an injection mould for production of undercut components. The mould comprises two semi-circular mould halves, which are brought together to define a cavity together with a core. The mould halves are locked in their joined state by means of a sleeve which has an inner conical surface and which is passed over the joined mould halves, which have a complementary outer conical surface. There is no indication of how an increased production capacity is to be achieved.

SUMMARY OF THE INVENTION

An object of the present invention is to provide an improved method and an improved assembly for injection moulding of components.

Both the method and the assembly should preferably allow production of components at an improved production capacity.

One more object is to provide a mould which is usable in such an injection moulding assembly.

One more object is to provide use of such an injection moulding assembly for producing components for a mobile phone.

Yet another object is to provide a mobile phone comprising components produced in such an injection moulding assembly.

According to the present invention, to achieve the above objects and also other objects that will appear from the following description, there are provided a method, an injection moulding assembly, a mould, a component, use of an injection moulding assembly, and a mobile phone. Preferred embodiments of the injection moulding assembly are evident from the claims.

According to the present invention, a method for injection moulding is thus provided, comprising introducing, under pressure, a melt into a cavity defined by two mould halves of a mould, said method being characterised by the steps of joining the mould halves for definition of said cavity, by moving at least one of the mould halves along a first axis, and arranging a locking means on the mould by moving along a second axis extending transversely of said first axis, said locking means having locking surfaces which grasp the mould and its joined mould halves, at least one locking surface wedgingly engaging a complementarily designed surface of the mould to cause a conversion of the force by which the locking means is arranged on the mould, into a locking force for holding the mould halves together in their joined state.

This results in an improved method for injection moulding, which allows production of components at a relatively higher production capacity. More specifically, this is achieved owing to the fact that the mould halves of the mould are brought together along a first axis, and that a locking means is then moved towards the mould along a second transverse axis and thus locks the mould halves in their joined state by means of locking surfaces which wedgingly engage complementarily designed surfaces of the mould. The wedge effect makes it possible to convert, with reinforcement, the force by which the locking means is arranged on the mould into a locking force which acts to hold together the mould halves. This reinforced locking force in turn renders is possible to enlarge, in an existing injection moulding assembly, the surface area, which is projected parallel to the parting plane of the mould halves, of the cavities which are defined by the mould halves. This enlarged surface area can be used to produce larger components or a larger number of components during an injection moulding shot in one and the same mould.

Moreover, according to the present invention an assembly for injection moulding is provided, comprising a mould with two mutually joinable mould halves which in their joined state define a cavity, a first and a second section, and a unit for bringing together said sections, said sections in their joined state being intended for locking of the mould with its mould halves in a joined state to allow introduction of a melt under pressure into said cavity, said assembly being characterised in that said mould is supported by said first section, and said second section supports a locking means comprising two separately arranged members which each have a locking surface which is engageable with a complementarily designed surface of the mould by bringing together the sections.

As a result, an assembly is provided, which allows production of components at a relatively higher production capacity. More specifically, this is achieved by said locking means, which is arrangeable on the mould by bringing together the sections. The locking means can be designed in such manner that the force by which the locking means is arranged on the mould is converted, under reinforcement, into a locking force for holding together the mould halves of the mould. As a consequence, a relatively smaller injection moulding assembly can be used to produce a given number of components per injection moulding shot or, alternatively, a relatively larger number of components can be produced per injection moulding shot in an existing injection moulding assembly.

According to a preferred embodiment the locking surfaces of the locking means are arranged in such manner that, when bringing together the sections, they grasp the mould to lock its mould halves in the joined state.

According to another preferred embodiment, at least one of said locking surfaces has a wedge angle for causing a wedging engagement with the surface which is designed complementarily thereto, when bringing together the sections. By suitably selecting said wedge angle, a reinforced locking force is achieved, which acts to hold together the mould halves. Advantageously both locking surfaces have a wedge angle.

The wedge angle is preferably less than 45° and is advantageously in the range of 1–25°.

According to yet another preferred embodiment, the members of the locking means are connected with each other. Preferably, the members are interconnected by means of a tension element, which advantageously comprises metal plates arranged on both sides of the members, said members being arranged with their locking surfaces facing each other.

According to a further preferred embodiment, the mould halves of the mould are joinable along a first axis, and the unit acts to bring together the sections along a second axis extending transversely of the first axis.

According to another preferred embodiment, a first of said mould halves is fixedly arranged and a second of said mould halves is movingly arranged.

According to another preferred embodiment, the first section is fixedly arranged and the second section is movingly arranged.

According to another preferred embodiment, the mould halves in their joined state define a plurality of cavities which are not necessarily identical. Said cavities can form separate groups which each are supplied with melt from an extruder unit.

According to another preferred embodiment, the mould comprises a plurality of pairs of mutually joinable mould halves.

According to another preferred embodiment, the first section supports a plurality of moulds. Preferably the locking means for each mould has a pair of separately arranged members which each have a locking surface.

Moreover, according to the present invention, a mould for an injection moulding assembly is provided, comprising two mutually joinable mould halves, which in their joined state define at least one cavity, said mould being characterised in that the mould is mountable on a first section of the injection moulding assembly and has external surfaces with which locking surfaces of a locking means supported by a second section of the injection moulding assembly are engageable to lock the mould with its mould halves in their joined state.

According to the present invention, also an assembly for injection moulding is provided, comprising a mould with two mutually joinable mould halves which in their joined state define a cavity, said assembly being characterised by a locking means for locking the mould with its mould halves in their joined state to allow introduction of a melt under pressure into said cavity, said locking means comprising two separately arranged engaging means and a tension element which connects said engaging means with each other, said locking means being movable to a position, in which its engaging means engage said mould during simultaneous stretching of said tension element, said stretching generating a locking force for causing said locking of the mould. According to this aspect of the present invention, the engaging means of the locking means are thus caused to engage the mould in such manner that the tension element is stretched. This results in a bias which generates a locking force that acts to lock the mould.

Moreover, according to the present invention, a method for an injection moulding is provided, comprising bringing together two sections for holding together joined mould halves of a mould, and introducing under pressure a melt into one or more cavities defined by said joined mould halves, said method being characterised by the step of bringing together the sections by means of a force which is less than the resulting force which, during introduction of the melt into or more cavities, acts to divide the mould halves.

Furthermore according to the present invention, a component produced in an injection moulding assembly as stated above is provided.

Further according to the present invention, use of an injection moulding assembly as stated above is provided for production of components for a mobile phone.

Finally, according to the present invention a mobile phone is provided, comprising components produced in an injection moulding assembly as stated above.

A number of preferred embodiments of the present invention will now be described by way of example with reference to the accompanying drawings.

DESCRIPTION OF EMBODIMENTS

Figure 1:
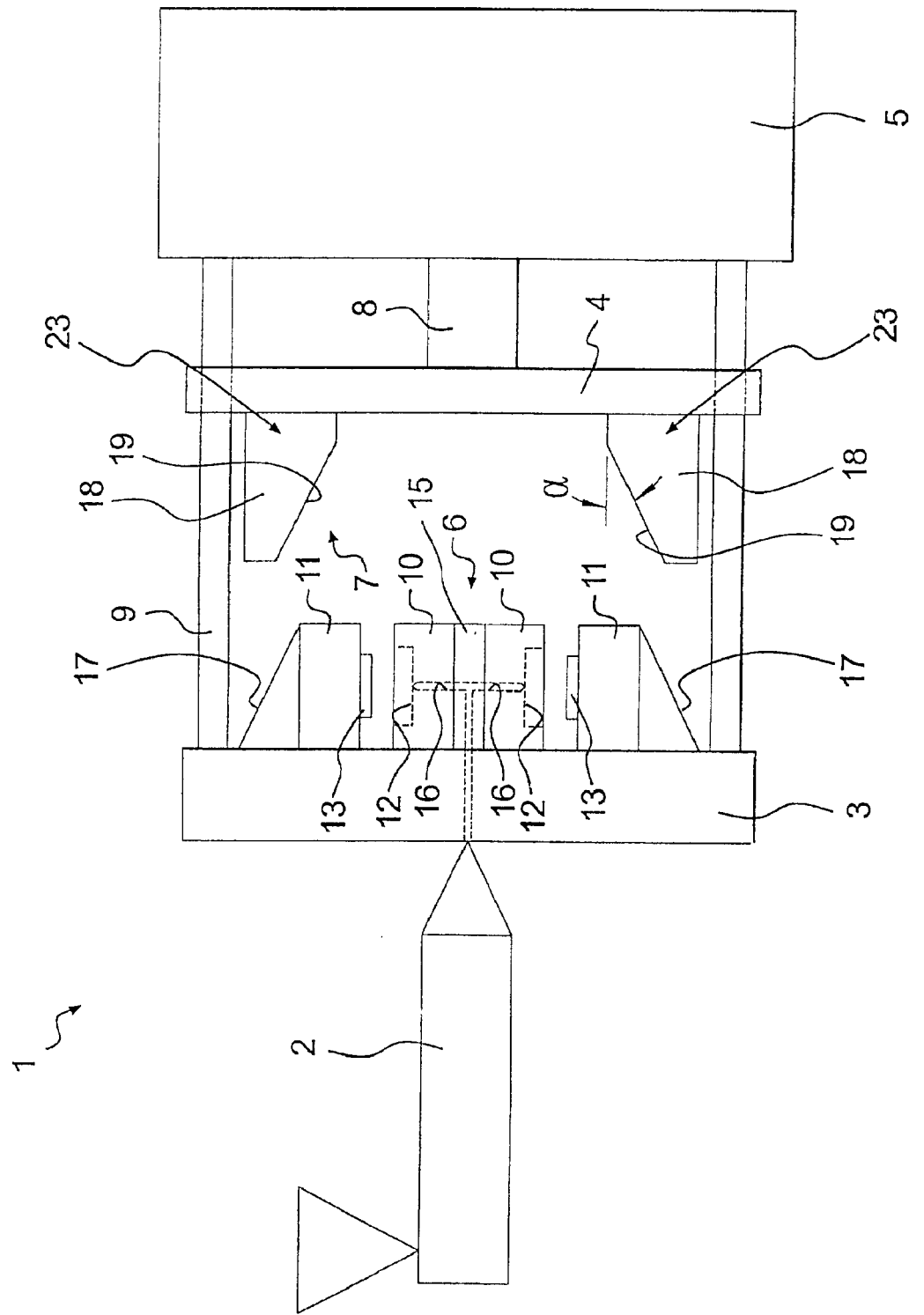
FIG. 1 is a schematic top plan view of a preferred embodiment of an inventive injection moulding assembly.
Figure 2:
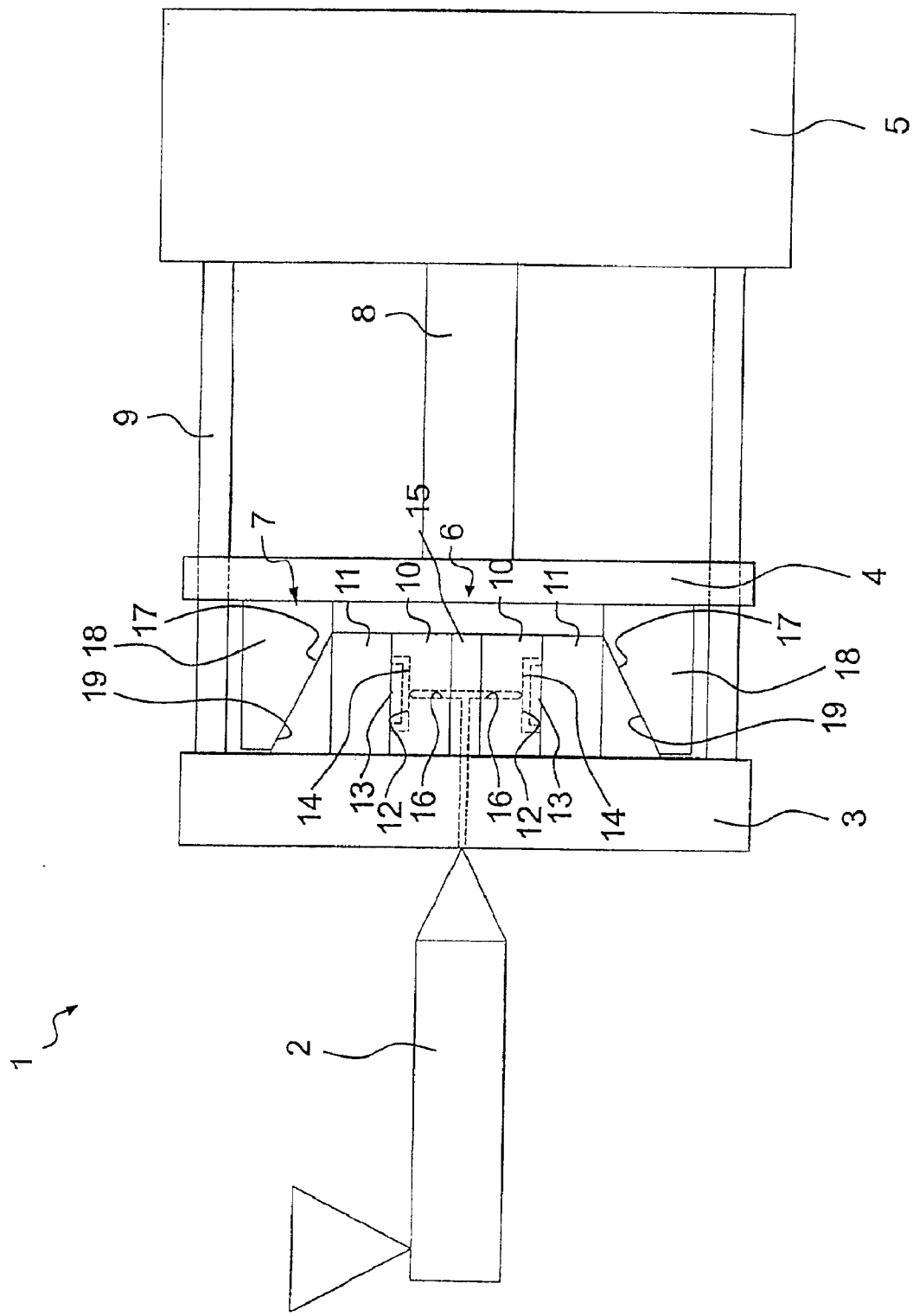
FIG. 2 is a schematic top plan view of the injection moulding assembly shown in FIG. 1, in which two sections of the assembly are shown in their joined state.

FIGS. 1 and 2, to which reference is made, illustrate schematically a preferred embodiment of an inventive injection moulding assembly 1.

According to the preferred embodiment, the injection moulding assembly 1 comprises an extruder unit 2, a first section 3, a second section 4, and a unit 5 for bringing together the sections 3, 4. However, it will be appreciated that the present invention is not restricted to thus designed injection moulding assemblies.

The extruder unit 2, which is intended for supply of a melt, preferably a plastic melt, to a mould 6 of the injection moulding assembly 1, is of a conventional kind and will therefore not be described in detail.

The first section 3, which is fixedly arranged, supports the above-mentioned mould 6.

The second section 4, which is movingly arranged, supports a locking means 7.

The unit 5 for bringing together the sections 3, 4 is of a conventional kind and comprises in the shown embodiment a plunger means 8 which is connected to the second section 4 for moving the same towards the first section 3. Guide means 9 are arranged to guide the movement of the second section 4.

The mould 6 supported by the first section 3 comprises two pairs of mould halves 10, 11, which are aligned with each other.

A first mould half 10 of each pair is fixedly arranged and a second mould half 11 of each pair is movingly arranged, whereby the mould halves 10, 11 of each pair are mutually joinable.

It should be noted that the sections 3, 4 are joined along an axis which extends transversely of the axis along which the mould halves 10, 11 are brought together. This is illustrated more clearly in FIGS. 4 and 5.

A recess 12 is formed in the first mould half 10 of each pair and a complementarily designed projection 13 is arranged on the second mould half 11 of each pair. The mould halves 10, 11 of each pair will thus in their joined state define a cavity 14 for producing thin-walled components. However, it will be appreciated that the cavity defined by the mould halves need not necessarily be designed for production of thin-walled components.

The mould 6 further comprises a distributing unit 15 for distributing the melt supplied to the mould 6 to ducts 16 which pass the melt on to the respective cavities 14.

Finally the mould 6 has a surface 17 on each side of the mould 6, which surfaces 17 are arranged to cooperate with said locking means 7 and will be described in more detail below.

The locking means 7 comprises two separately arranged engaging means 23. According to the shown embodiment, the engaging means 23 are in the form of separate members 18 which each have a locking surface 19. The locking surfaces 19 are, by bringing together the sections 3, 4, engageable with the above-mentioned surfaces 17 of the mould 6, the surfaces 17 of the mould 6 being designed complementarily to said locking surfaces 19. The engaging means 23 advantageously are connected with each other by means of a tension element (not shown). The tension element will be described in more detail with reference to FIGS. 3–5.

More specifically, the locking surfaces 19 of the members 18 are angled at an angle $\alpha$ relative to the axis along which the second section 14 is movable towards the first section 3.

For injection moulding of components, the mould halves 10, 11 of each pair are moved to their mutually joined state. Then the unit 5 for bringing together the sections 3, 4 is operated. The locking means 7 of the second section 4 will thus grasp the mould 6 supported by the first section 3. More specifically, the locking surfaces 19 of the locking means 7 will be engaged with the complementarily designed surfaces 17 of the mould 6, whereby the force by which the second section 4 is moved towards the first section 3 is converted into a locking force for holding together the mould halves 10, 11 in their joined state.

By selecting a suitable angle $\alpha$ of the locking surfaces 19 it is possible to achieve a reinforcement in this conversion of force.

The conversion of force achieved in each member 18 has the following relationship (without taking the loss due to friction between the surfaces 17, 19 into consideration):

$$F_x = F_y / \tan \alpha$$

wherein $F_y$ is the force by which the locking surface 19 of the member 18 is engaged with the surface 17 of the mould 6 and $F_x$ is the locking force for holding together the mould halves 10, 11.

$1/\tan \alpha$ forms a reinforcement factor F, which is greater than 1 if $\alpha < 45°$.

The angle $\alpha$ is preferably in the range of 1–25°, more preferred in the range 3–10° and most preferred in the range 5–8°.

Preferably the locking surfaces 19 are plane, but it will be appreciated that they can also be formed with a certain bend.

When the mould halves 10, 11 thus are locked in their joined state, a melt can be introduced into the cavities 14 defined by the mould halves 10, 11. The melt can be a plastic melt for production of a plastic component. It will be appreciated, however, that also silicone, metal or rubber melts are conceivable.

It should be noted that in the shown embodiment the force acting to divide the mould halves 10, 11 will not be greater than in the case where the mould had comprised only one pair of mould halves. The reason for this is that the pairs of mould halves are aligned with each other, whereby also the surface areas projected parallel to the respective parting planes are aligned with each other.

According to the present invention, an injection moulding assembly 1 is thus provided, which allows injection moulding of components where the force generated during injection moulding and acting to divide the mould halves 10, 11 exceeds the force by which the sections 3, 4 of the injection moulding assembly 1 are brought together. As described above, this is achieved in the shown embodiment with the aid of a locking means 7, which with reinforcement acts to convert this force of bringing together into a locking force for holding together the mould halves 10, 11 in their joined state.

In practical experiments, a locking means 7 with an angle $\alpha$ of 8° of the locking surfaces 19 has been used, in which case the reinforcement factor F will be about 7. This means that the production capacity of the injection moulding assembly 1 can be increased correspondingly, i.e. by a factor 7.

It will be appreciated that the gain will be significant. By modifying the mould 6 and supplementing with a locking means 7 as described above, it will thus be possible to increase the capacity in an existing injection moulding assembly. More specifically, the number of components that are produced during an injection moulding shot can be increased considerably, in the given example by a factor 7. Thus, the time of production for producing a series of products in an existing injection moulding assembly can be reduced significantly. Also the need of providing larger assemblies of higher capacity is eliminated.

Figure 3:
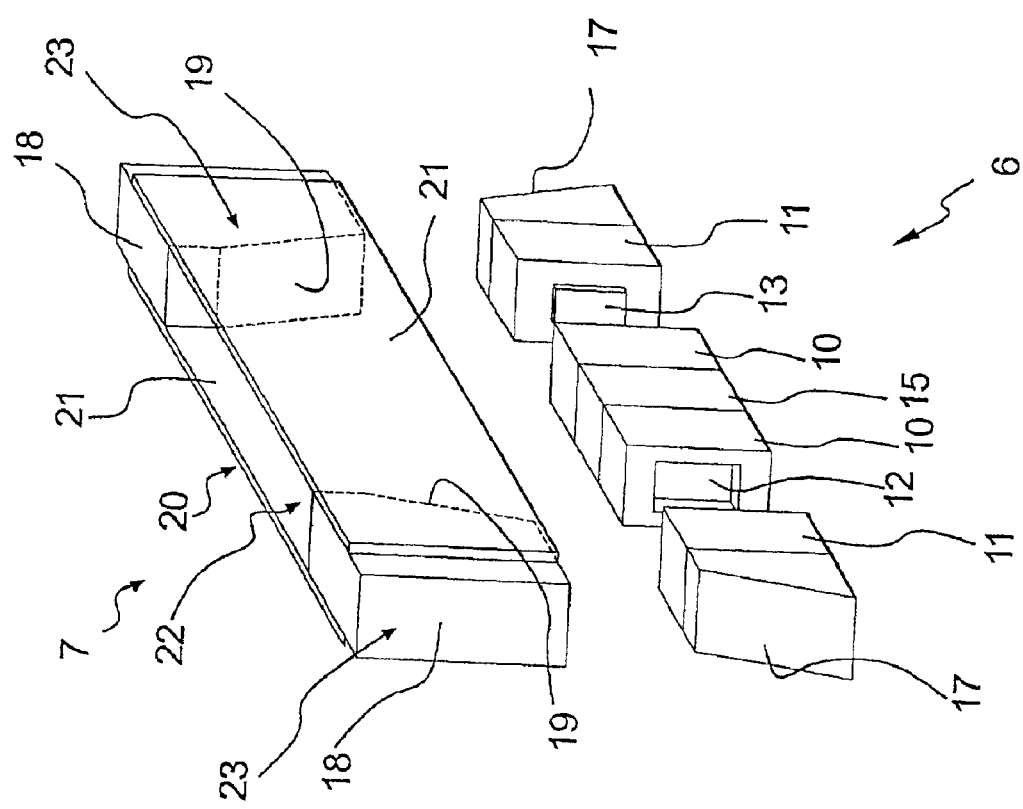
FIG. 3 is a schematic perspective view of an embodiment of a locking means and a mould of an inventive injection moulding assembly, mould halves of the mould being shown in a divided state.
Figure 4:
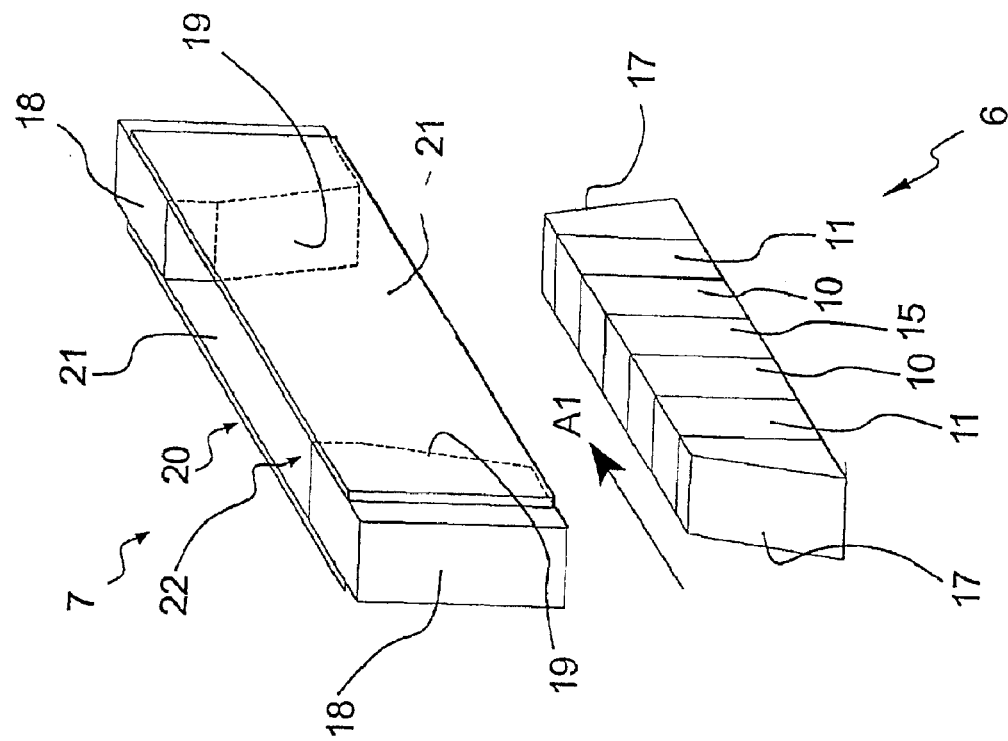
FIG. 4 is schematic perspective view of the locking means and the mould in FIG. 3, the mould halves being shown in a joined state.
Figure 5:
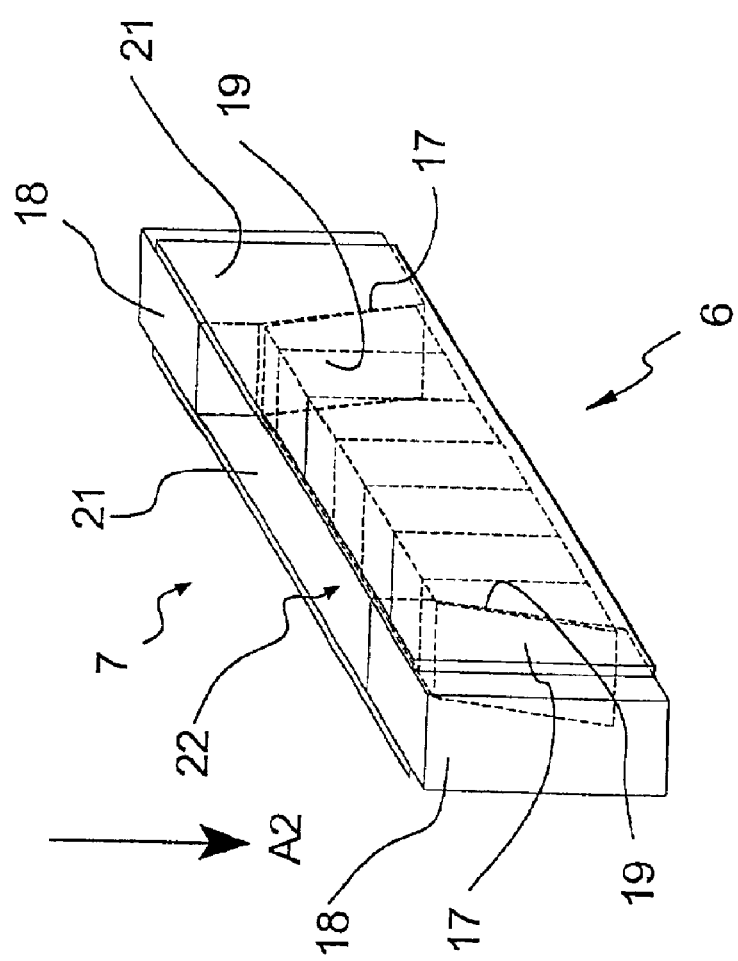
FIG. 5 is a schematic perspective view of the locking means and the mould in FIG. 3, the locking means and the mould being shown in a joined state.

FIGS. 3–5, to which reference is now made, illustrate the locking means 7 and the mould 6 in a second preferred embodiment of the present invention.

The mould 6 comprises, like the mould described with reference to FIGS. 1 and 2, two pairs of mould halves 10, 11. The mould 6 is further made up of modules, thus making it possible to easily adapt the mould to different components.

The locking means 7 comprises, in addition to the previously described engaging means 23 in the form of members 18, also a tension element 20, which connects the two members 18 with each other. In the embodiment shown, the tension element 20 consists of two metal plates 21, which are attached to the sides of the members 18 in such manner that their locking surfaces 19 face each other and between them define a free space 22.

The mould halves 10, 11 are shown in FIG. 3 in a divided state and in FIG. 4 in a joined state. The movingly arranged mould halves 11 of each pair of mould halves 10, 11 are moved along an axis A1 towards the two fixedly arranged mould halves 10.

In FIG. 5, the locking means 7 has been brought together with the mould 6 by moving along an axis A2, which extends transversely of the above-mentioned axis A1. The locking means 7 grasps the mould 6 by the mould 6 being moved into the free space 22 between the locking surfaces 19 of the members 18. The locking surfaces 19 engage the complementarily designed surfaces 17 of the mould 6. The locking means 7 is advantageously arranged on the mould 6 by such a force that the converted locking force for holding together the mould halves 10, 11 will be so great that the tension element 20 designed in the form of metal plates 21 is stretched. This results in a bias which reliably holds together the mould halves 10, 11 during the subsequent injection moulding shot.

The present invention is particularly, but not exclusively, suitable for production of components for mobile phones, such as front and rear pieces as well as windows. The reason for this is that in many cases large series must be produced in a short time. By the present invention making it possible to increase the capacity, by means of the above-described modifications, in an existing injection moulding assembly, it is possible to use an existing plant of injection moulding assemblies for producing such large series in a short time.

According to the present invention, an injection moulding assembly 1 is thus provided which generates high locking forces using simple means. More specifically, this is achieved owing to a locking means 7 which locks the mould halves 10, 11 of the mould 6 in a joined state. The locking means 7 comprises engaging means 23 which engage the mould 6 during simultaneous stretching of a tension element 20 which connects the engaging means 23 with each other. Such stretching generates a locking force which holds together the mould halves 10, 11 during the injection moulding process. By designing, for instance, the engaging means 23 in the form of wedge-shaped members 18, it will be possible to use the unit 5 that is available in conventional injection moulding assemblies for bringing together the sections 3, 4 of the assembly and convert the force necessary for bringing together the sections 3, 4, during simultaneous reinforcement, into a force for locking the mould halves 10, 11 of the mould 6.

It will appreciated that the present invention is not restricted to the embodiments illustrated.

Figure 6:
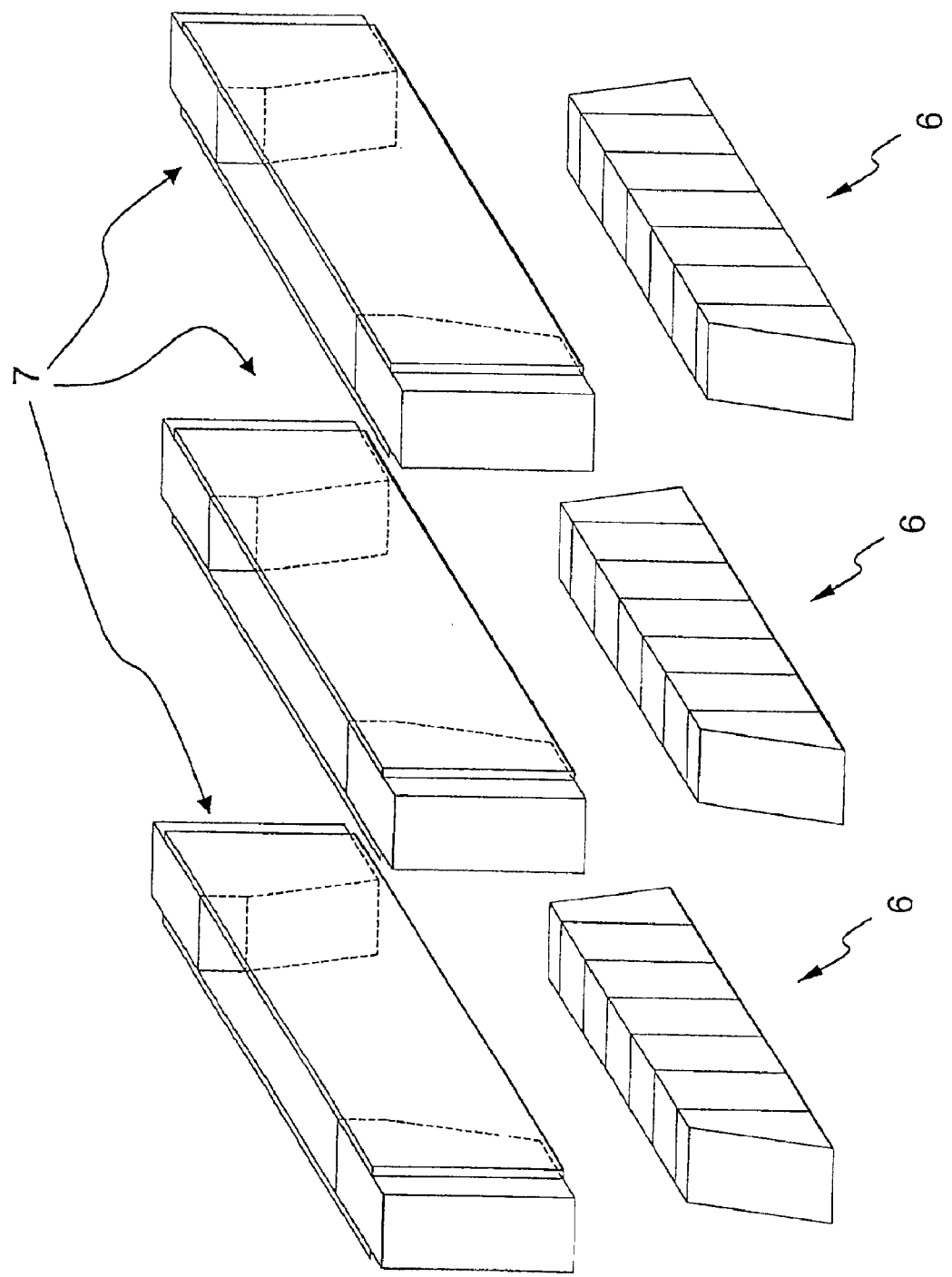
FIG. 6 is a schematic perspective view of an arrangement comprising three locking means and three moulds.

For instance, it is possible to let the first section support a plurality of moulds, in which case a corresponding number of locking means can be arranged to lock the mould halves of the mould in their joined state. Such an arrangement of moulds 6 and locking means 7 is schematically shown in FIG. 6.

It will also be appreciated that each mould may comprise only one pair of mould halves or more than two pairs of mould halves.

Further it will be appreciated that each pair of mould halves can define a plurality of cavities which are not necessarily identical. For instance, it is possible to arrange two extruder units of the injection moulding assembly, each extruder units being arranged to supply a group of mutually identical cavities with a melt. As a result, simultaneous production of, for instance, front and rear pieces for mobile phones in one and the same injection moulding assembly is allowed. The capability of the injection moulding assembly will also be improved since the number of products per process will be smaller.

Finally, it will be appreciated that the locking means need not be designed in the manner described above. For example, it is possible to provide only the locking surface of one member with a wedge angle $\alpha$.

Consequently, several modifications and variations are feasible, which means that the scope of the invention is exclusively defined by the appended claims.

What is claimed is:

1. A method for injection moulding, comprising introducing, under pressure, a melt into a cavity (14) defined by two mould halves (10, 11) of a mould (6), characterised by the steps of joining the mould halves (10, 11) for definition of said cavity (14), by moving at least one of the mould halves (11) along a first axis (A1), and arranging a locking means (7) on the mould (6) by moving along a second axis (A2) extending transversely of said first axis (A1), said locking means (7) having locking surfaces (19) which grasp the mould (6) and its joined mould halves (10, 11), at least one locking surface (19) wedgingly engaging a complementarily designed surface (17) of the mould (16) to cause a conversion of the force by which the locking means (7) is arranged on the mould (6), into a locking force for holding the mould halves (10, 11) together in their joined state.

2. A method for injection moulding, comprising the steps of providing a mould (6) with two mutually joinable mould halves which in their joined state define a cavity (14), providing a first (3) and a second (4) section, and providing a unit (5) for bringing together said sections (3, 4), said mould (6) is supported by said first section (3), and said second section (4) supports a locking means (7), bringing together the two sections (3, 4) for holding together joined mould halves (10, 11) of a mould (6), and introducing under pressure a melt into one or more cavities (14) defined by said joined mould halves (10, 11), characterised by the step of bringing together the sections (10, 11) by means of a force which is less than the resulting force which, during introduction of the melt into one or more cavities (14), acts to divide the mould halves (10, 11).

3. An assembly for injection moulding, comprising a mould (6) with two mutually joinable mould halves which in their joined state define a cavity (14), a first (3) and a second (4) section, and a unit (5) for bringing together said sections (3, 4), said sections (3, 4) in their joined state being intended for locking of the mould (6) with its mould halves (10, 11) in their joined state to allow introduction of a melt under pressure into said cavity (14), characterised in that said mould (6) is supported by said first section (3), and said second section (4) supports a locking means (7) comprising two separately arranged members (18) which each have a locking surface (19) which is engageable with a complementarily designed surface (17) of the mould (6) by bringing together the sections (3, 4), wherein at least one of said locking surfaces (19) has a wedge angle ($\alpha$) for causing a wedging engagement with the surface (17) which is designed complementarily thereto, when bringing together the sections (3,4).

4. An assembly as claimed in claim 3, in which said locking surfaces (19) are arranged in such manner that, when bringing together the sections (3, 4), they grasp the mould (6) for locking its mould halves (10, 11) in their joined state.

5. An assembly as claimed in claim 3, in which both locking surfaces (19) have a wedge angle ($\alpha$).

6. An assembly as claimed in claim 3, in which the wedge angle ($\alpha$) is less than 45°.

7. An assembly as claimed in claim 6, in which the wedge angle ($\alpha$) is in the range of 1–25 °.

8. An assembly as claimed in claim 3, in which said members (18) are connected with each other.

9. An assembly as claimed in claim 8, in which the members (18) are connected with each other by means of a tension element (20).

10. An assembly as claimed in claim 9, in which the tension element (20) comprises metal plates (21) which are arranged on both sides of the members (18), the members (18) being arranged with their locking surfaces (19) facing each other.

11. An assembly as claimed in claim 3, in which the mould halves (10, 11) of the mould (6) are joinable along a first axis (A1) and the unit (5) acts to bring together the sections (3, 4) along a second axis (A2) which extends transversely of the first axis (A1).

12. An assembly as claimed in claim 3, in which a first (10) of said mould halves (10, 11) is fixedly arranged and a second (11) of said mould halves (10, 11) is movingly arranged.

13. An assembly as claimed in claim 3, in which the first section (3) is fixedly arranged and the second section (4) is movingly arranged.

14. An assembly as claimed in claim 3, in which the mould halves (10, 11) in their joined state define a plurality of cavities (14) which are not necessarily identical.

15. An assembly as claimed in claim 14, in which said cavities form separate groups.

16. An assembly as claimed in claim 15, comprising a plurality of extruder units, each of which is adapted to supply a melt to a group of cavities.

17. An assembly as claimed in claim 3, in which the mould (6) comprises a plurality of pairs of mutually joinable mould halves (10, 11).

18. An assembly as claimed in claim 3, in which the first section (3) supports a plurality of moulds (6).

19. An assembly as claimed in claim 18, in which the locking means (7) for each mould (6) has a pair of separately arranged members (18) which each have a locking surface (19).

20. An assembly as claimed in claim 5, in which the wedge angle ($\alpha$) is less than 45°.

21. A mould for an injection moulding assembly (1), comprising two mutually joinable mould halves (10, 11), which in their joined state define at least one cavity (14), characterized in that the mould is mountable on a first section (3) of the injection moulding assembly (1) and has external surfaces (17), with which locking surfaces (19) of a locking means (7) supported by a second section (4) of the injection moulding assembly (1) are engageable to lock the mould with its mould halves (10, 11) in the joined state, wherein at least one of said locking surfaces (19) has a wedge angle ($\alpha$) for causing a wedging engagement with the surface (17) which is designed complementarily thereto, when bringing together the sections (2, 4).

* * * * *